(12) United States Patent
Finsterbusch et al.

(10) Patent No.: US 9,134,596 B2
(45) Date of Patent: Sep. 15, 2015

(54) LIGHT MODULE FOR A PROJECTION DEVICE

(71) Applicant: OSRAM GmbH, Munich (DE)

(72) Inventors: Klaus Finsterbusch, Berlin (DE); Ulrich Hartwig, Berlin (DE)

(73) Assignee: OSRAM GmbH, Munich (DE)

( * ) Notice: Subject to any disclaimer, the term of this patent is extended or adjusted under 35 U.S.C. 154(b) by 112 days.

(21) Appl. No.: 14/085,835

(22) Filed: Nov. 21, 2013

(65) Prior Publication Data

US 2014/0146244 A1 May 29, 2014

(30) Foreign Application Priority Data

Nov. 23, 2012 (DE) .......................... 10 2012 221 467

(51) Int. Cl.

| | |
|---|---|
| *G02F 1/1335* | (2006.01) |
| *G03B 21/20* | (2006.01) |
| *G03B 21/00* | (2006.01) |
| *G02B 27/10* | (2006.01) |
| *G02B 27/18* | (2006.01) |
| *G03B 33/12* | (2006.01) |
| *H04N 9/31* | (2006.01) |

(52) U.S. Cl.
CPC .......... *G03B 21/204* (2013.01); *G02B 27/1026* (2013.01); *G02B 27/18* (2013.01); *G03B 21/006* (2013.01); *G03B 21/2073* (2013.01); *G03B 33/12* (2013.01); *H04N 9/3102* (2013.01); *H04N 9/3105* (2013.01); *H04N 9/3161* (2013.01)

(58) Field of Classification Search
CPC ............. G02B 27/1026; H04N 9/3197; H04N 9/3167; H04N 9/3105
USPC ................................................. 349/9; 353/20
See application file for complete search history.

(56) References Cited

U.S. PATENT DOCUMENTS

| | | | |
|---|---|---|---|
| 4,904,061 A | 2/1990 | Aruga | |
| 5,812,223 A | 9/1998 | Noguchi | |
| 7,547,114 B2 | 6/2009 | Li et al. | |
| 2011/0222022 A1* | 9/2011 | Sato ............................... | 353/20 |
| 2013/0329426 A1 | 12/2013 | Finsterbusch et al. | |
| 2013/0342769 A1* | 12/2013 | Koelper et al. .................... | 349/5 |

FOREIGN PATENT DOCUMENTS

| | | |
|---|---|---|
| DE | 19607510 C2 | 11/2001 |
| DE | 102011004574 B4 | 10/2012 |

OTHER PUBLICATIONS

German Office Action, dated Apr. 30, 2013; 5 pages.

* cited by examiner

*Primary Examiner* — Thanh-Nhan P Nguyen

(57) ABSTRACT

A light module for a projection device may include: at least one light source designed to emit partly polarization radiation; and a first polarization beam splitter, which is arranged in the beam path of the radiation emitted by the at least one light source, wherein the polarization beam splitter is designed to provide radiation of a first polarization at a first output and radiation of a second polarization at a second output. The light module includes a first beam cube arranged in the beam path of the radiation, a first to fourth LCD panels; a second dichroic beam splitter arranged between a first output of the first polarization beam splitter and a first input of the beam cube.

15 Claims, 3 Drawing Sheets

LIGHT MODULE FOR A PROJECTION DEVICE

CROSS-REFERENCE TO RELATED APPLICATION

This application claims priority to German Patent Application Serial No. 10 2012 221 467.4, which was filed Nov. 23, 2012, and is incorporated herein by reference in its entirety.

TECHNICAL FIELD

Various embodiments relate generally to a light module for a projection device including at least one light source designed to emit partly polarized radiation, and a first polarization beam splitter, which is arranged in the beam path of the radiation emitted by the at least one light source, wherein the polarization beam splitter is designed to provide radiation of a first polarization at a first output and radiation of a second polarization at a second output.

BACKGROUND

A conventional light module is described in DE 196 07 510 C2. FIG. 1 of said document illustrates a light module in which a light flux generated by a light source is incident on a polarization beam splitter. Accordingly, a p-polarized light component and an s-polarized light component are available at the output of said polarization beam splitter. The s-polarized light component is directed onto a first LCD panel. The p-polarized light component is split into a red, a green and a blue light flux by means of two dichroic mirrors. The red light flux is incident on a second LCD panel, the green light flux is incident on a third LCD panel, and the blue light flux is incident on a fourth LCD panel. The light fluxes which are incident on the respective LCD panels are modulated by means of image data provided by a video signal and are subsequently recombined by means of two dichroic mirrors. By means of a second polarization beam splitter, the s-polarized light component is subsequently recombined with the red, green and blue light fluxes, fed to a projection lens and subsequently projected onto a screen.

The light module disclosed in the cited document accordingly requires four dichroic mirrors alongside two polarization beam splitters. This results in undesirably high costs that are undesirable for specific applications. Moreover, the light module known from the cited document is a relatively large construction, and so it cannot be used for specific applications, for example projection devices in cellular phones.

SUMMARY

A light module for a projection device may include: at least one light source designed to emit partly polarization radiation; and a first polarization beam splitter, which is arranged in the beam path of the radiation emitted by the at least one light source, wherein the polarization beam splitter is designed to provide radiation of a first polarization at a first output and radiation of a second polarization at a second output. The light module includes a first beam cube arranged in the beam path of the radiation, a first to fourth LCD panels; a second dichroic beam splitter arranged between a first output of the first polarization beam splitter and a first input of the beam cube.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
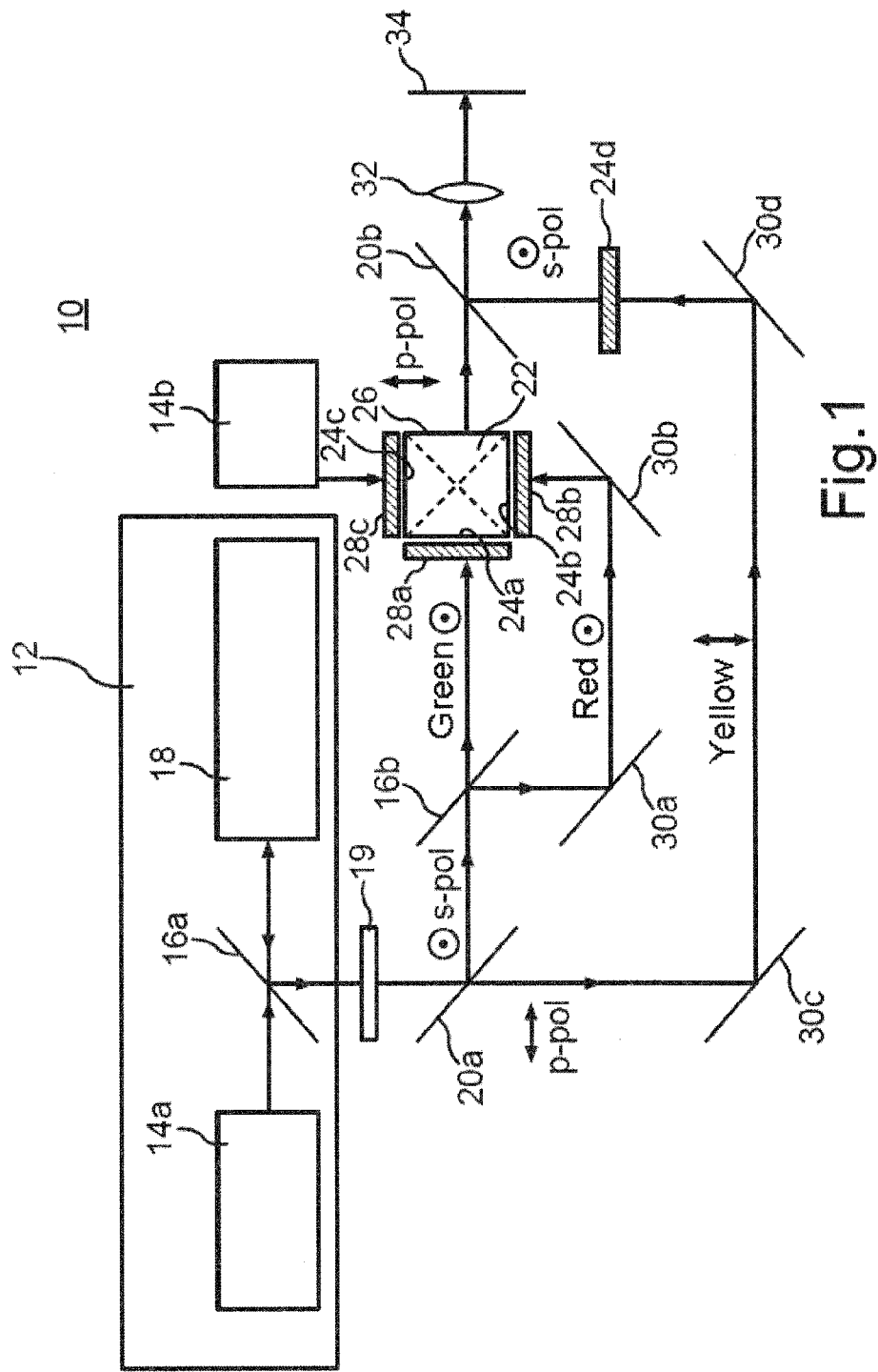
FIG. 1 shows a first embodiment of a light module according to various embodiments in schematic illustration.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments develop a light module in such a way that it can be realized at low costs and with the smallest possible space requirement.

Various embodiments are based on the insight that the abovementioned object can be optimally achieved if the combination of at least one laser device, a conversion device and a dichroic beam splitter is used as light source. In this way, it is possible for a light source that emits partly polarized radiation to be realized in a very small space. The term "partly polarized radiation" hereinafter encompasses randomly polarized radiation and radiation polarized in regions, e.g. unpolarized radiation. Furthermore, the light from the laser device which is used for excitation and which emits in the blue wavelength range can be additionally used for shining through the LCD panel provided for the blue light flux. This enables the present invention to manage with only two dichroic mirrors. Finally, provision is made for arranging three of the four LCD panels at a beam cube. As a result, it is possible to realize a light module for a projection device which firstly can be produced cost-effectively, and secondly can be realized with a very small space requirement.

One particularly significant advantage results from the fact that a four-channel LCD system can be realized by means of a light module according to the invention, for example with the colors red, green, blue, yellow (RGBY), whereas the light module known from the document cited above merely makes it possible to realize a conventional three-channel LCD system (RGB). It should particularly be pointed out that RGB and Y components can be superimposed spatially in a light module according to the invention, without the etendue being impaired. Thus, the entire light generated by the light source can be utilized with the etendue remaining the same. Furthermore, a hitherto unknown flexibility arises in the case of a light module according to the invention: by way of example, with an overaccentuated yellow together with an overaccentuated blue it is possible to generate a white, i.e. a colorless or achromatic, light component for increasing the luminous flux. This can be used beneficially e.g. in data and video projection.

As already mentioned, it may be advantageous if the second laser device constitutes at least one of the at least one first laser device(s). The at least one first laser device can be, in various embodiments, a matrix of laser devices which emits partly polarized light as a result. One or a plurality thereof can form the second laser device, for example by the radiation that penetrates through the conversion device upon saturation thereof being used further. Alternatively, the second laser device can be formed by a laser device that differs from the first laser device. This may be advantageous in various embodiments if greater freedom in the choice of the spectrum of the blue channel is desired. By way of example, the conversion device can be excited at a wavelength of 440 nm, while the second laser device provides radiation at a wavelength of 460 nm.

In various embodiments, a second deflection device is arranged in the beam path of the radiation penetrating through the first polarization beam splitter and is designed to deflect the radiation penetrating through the first polarization beam splitter onto the second polarization beam splitter. In various embodiments, the first deflection device includes the series circuit formed by a first and a second deflection mirror. In this way, the corresponding luminous flux can be directed to the second input of the beam cube.

The second deflection device, too, in various embodiments includes the series circuit formed by a first and a second deflection mirror. This makes it possible to guide the luminous flux penetrating through the first polarization beam splitter to the second polarization beam splitter.

In one variant of a light module according to the invention, beam paths of identical length are provided for the different spectral components. In various embodiments, the respective beam path from the respective LCD panel to the lens arranged downstream of the beam combination is of identical length, such that all four color components can be projected sharply onto a screen through said lens. This is achieved by virtue of the fact that the first deflection device includes a first deflection mirror, wherein a third deflection device, which may include a deflection mirror, is arranged in the beam path of the radiation penetrating through the second dichroic beam splitter and the first input of the beam cube. In various embodiments, in this variant, the second deflection device likewise includes a deflection mirror.

The abovementioned advantage of the sharp imaging of all four color components through a lens arranged downstream of the beam combination can be achieved, in various embodiments, if the first dichroic beam splitter, the second dichroic beam splitter, the first deflection device, the second deflection device, the third deflection device and the beam cube are arranged with respect to one another in such a way that the following distances are identical to +/−10%, in various embodiments +/−0%: the distance of the beam path which begins at the first dichroic beam splitter enters into the beam cube via the first input, passes through the beam cube and emerges at the output thereof as far as the second polarization beam splitter; then the distance of the beam path which begins at the first dichroic beam splitter, enters into the beam cube via the second input, passes through the beam cube and emerges at the output thereof as far as the second polarization beam splitter, and finally the distance of the beam path which begins at the first dichroic beam splitter via the second deflection device as far as the second polarization beam splitter.

The present invention can also be used for generating 3D projections. In this context, a first optical unit is formed from the second dichroic beam splitter, the beam cube, the first deflection device and the second laser device, wherein a second optical unit of this type is provided, wherein the LCD panel disposed upstream of the second input constitutes the fourth LCD panel, wherein the second optical unit is arranged in the beam path between the second deflection device and the second polarization beam splitter. The first optical unit accordingly makes it possible to span a first color space, while the second optical unit spans a second color space. Through the use of polarization spectacles, therefore, 3D representations can be made available to a user.

For all the embodiments it may be provided for the conversion device to include a phosphor having a dominant wavelength in the yellow wavelength range. In this way, by excitation by means of at least one laser device which emits in the blue wavelength range, it is possible to generate spectral components in the red, green and yellow wavelength ranges. According to the invention, a dominant wavelength in the yellow spectral range includes a spectrum which also has spectral components in the green and red wavelength ranges.

In this context, accordingly, in various embodiments the first wavelength subrange is in the green wavelength range and the second wavelength subrange is in the red wavelength range, or vice versa. For alternative embodiments, the conversion device may also include at least one phosphor including a dominant wavelength in the green and/or red wavelength range. In this way, by way of example, it is possible to generate a deeper green and/or red component in the projection. Generally, however, the phosphor, which can also constitute a mixture of phosphors, is designed such that the converted radiation can be decomposed into green and red wavelength subranges. Within the light source of a light module according to the invention, the first dichroic beam splitter can be designed to be transmissive or reflective for radiation emitted by the at least one first laser device and reflective or transmissive for radiation emitted by the conversion device. Finally, the phosphor can be arranged on a color wheel, wherein the color wheel has a slot or a transparent location, thereby making it possible in a particularly simple manner to use at least one first laser device as second laser device. In this context, provision can also be made for the first laser device to constitute a matrix of a plurality of laser devices, for example, wherein one subset of said laser devices represents the first laser device and another subset of said matrix represents the second laser device. In this case, the subsets can also overlap, and indeed even be identical.

FIG. 1 shows a first embodiment of a light module 10 according to the invention for a projection device. The latter includes a light source 12, which in the present case for its part includes a laser device 14a designed to emit radiation in the blue wavelength range, in various embodiments between 440 and 460 nm. Said radiation is fed via a dichroic mirror 16a, which is designed to be transmissive for radiation in the blue wavelength range, to a phosphor 18 which emits radiation in the yellow wavelength range, e.g. between 550 and 570 nm, upon excitation by radiation in the blue wavelength range.

The phosphor 18 is designed to be reflective, that is to say is arranged on a mirror as substrate. In this respect, the radiation emitted by the phosphor 18 is reflected back again to the dichroic mirror 16a, where it is then reflected and directed onto a polarization beam splitter 20a. Said radiation is partly polarized in the sense of the definition above. If separate laser devices or matrixes of laser devices are used for the first 14a and the second laser device 14b, then it may be provided that the laser device 14a or matrix of laser devices 14a emits radiation at approximately 440 nm, while the laser device 14b or the matrix of laser devices 14b e.g. emits radiation in the wavelength range of 460 nm. A homogenizer 19 for homogenizing the radiation emitted by the phosphor 18 is provided between the dichroic mirror 16a and the polarization beam splitter 20a. The polarization beam splitter 20a provides at its outputs a first polarization component, in the present case an s-polarized component, and a second polarization component, in the present case a p-polarized component. The s-polarized component is split into a component in a first wavelength subrange and a component in a second wavelength subrange by means of a dichroic beam splitter. The first wavelength subrange in the present case is the green wavelength range, while the second wavelength subrange is the red wavelength range in the present case.

The light module 10 includes a beam cube 22 having a first input 24a, a second input 24b and also a third input 24c and an output 26. A beam cube 22 of this type is often also designated as an LCD light engine. A first LCD panel 28a is disposed upstream of the first input 24a, a second LCD panel 28b is disposed upstream of the second input 24b, and a third LCD panel 28c is disposed upstream of a third input. It should be pointed out that the polarization is rotated by 90° by an LCD panel with crossed filters. Accordingly, by means of the LCD panels used in the light module 10, an s-polarized radiation present at the input becomes a p-polarized radiation, and vice versa. In the present case, the radiation in the green wavelength range is directed onto the first LCD panel 28a, and the radiation in the red wavelength range is directed onto the second LCD panel 28b using two deflection mirrors 30a, 30b. Radiation in the blue wavelength range is in turn directed onto the third LCD panel 28c, for which purpose a second laser device 14b can be provided. This can be a separate laser device, i.e. a laser device separate from the first laser device 14a. However, the second laser device 14b can also be realized by the use of radiation emitted by the first laser device 14a, if said radiation is emitted to an extent such that the phosphor 18 attains saturation, that is to say can no longer convert any further radiation components. As a further alternative, the phosphor 18 can be mounted on a luminous wheel, wherein the luminous wheel can have a transparent region, in various embodiments a material-free slot, such that radiation components emitted by the laser device 14a, in specific positions of the luminous wheel, are not used for conversion and are thus available for driving the LCD panel 28c.

In this context, it should also be pointed out that the laser device 14a can be realized as a matrix of a multiplicity of laser devices, wherein different laser devices of said matrix can be in operation depending on the position of the luminous wheel. In this respect, a different subset of the matrix can be used for realizing the laser device 14b compared with that used for realizing the laser device 14a. The excitation of a phosphor 18 by means of a laser device 14a is also known by the designation laser activated remote phosphor (LARP).

Accordingly, an RGB signal is provided at the output 26 of the beam cube 22. By virtue of the fact that each LCD panel 28a, 28b, 28c modulates the image data provided by means of a video signal, an RGB image for projection is accordingly available at the output 26 of the beam cube 22.

The second polarization component, which is p-polarized in the present case, is fed via two further deflection mirrors 30c, 30d to a fourth LCD panel 24d. In the embodiment, said component supplies radiation components in the yellow wavelength range owing to the choice of phosphor 18. One phosphor that is particularly suitable for this purpose is known by the designation yttrium aluminum garnet:cerium (YAG:cerium), for example in the embodiment $(Y_{0.96}Ce_{0.04})_3Al_{3.75}Ga_{1.25}O_{12}$. While the radiation at the output 26 of the beam cube 22 is p-polarized, the radiation at the output of the LCD panel 24d is s-polarized. This makes it possible to superimpose these two radiation components without loss of etendue by means of a polarization beam splitter 20b. Accordingly, an RGBY signal, for example image information, is available at the output of the polarization beam splitter 20b, and can be projected onto a screen 34 via a lens 32.

As is obvious to a person skilled in the art, in the embodiment illustrated in FIG. 1, the respective polarizations can, of course, also be chosen to be exactly the opposite. The phosphor 18 can also constitute a mixture of phosphors, in various embodiments for converting the radiation emitted by the laser device 14a into the green and/or red wavelength range.

Through the choice of a suitable phosphor 18, in various embodiments the spectral distribution of its output signal after conversion, and the wavelength-dependent reflectivity of the dichroic mirror 16b, it is possible to coordinate the color loci and luminous fluxes in the red, green and yellow channels with one another.

Figure 2:
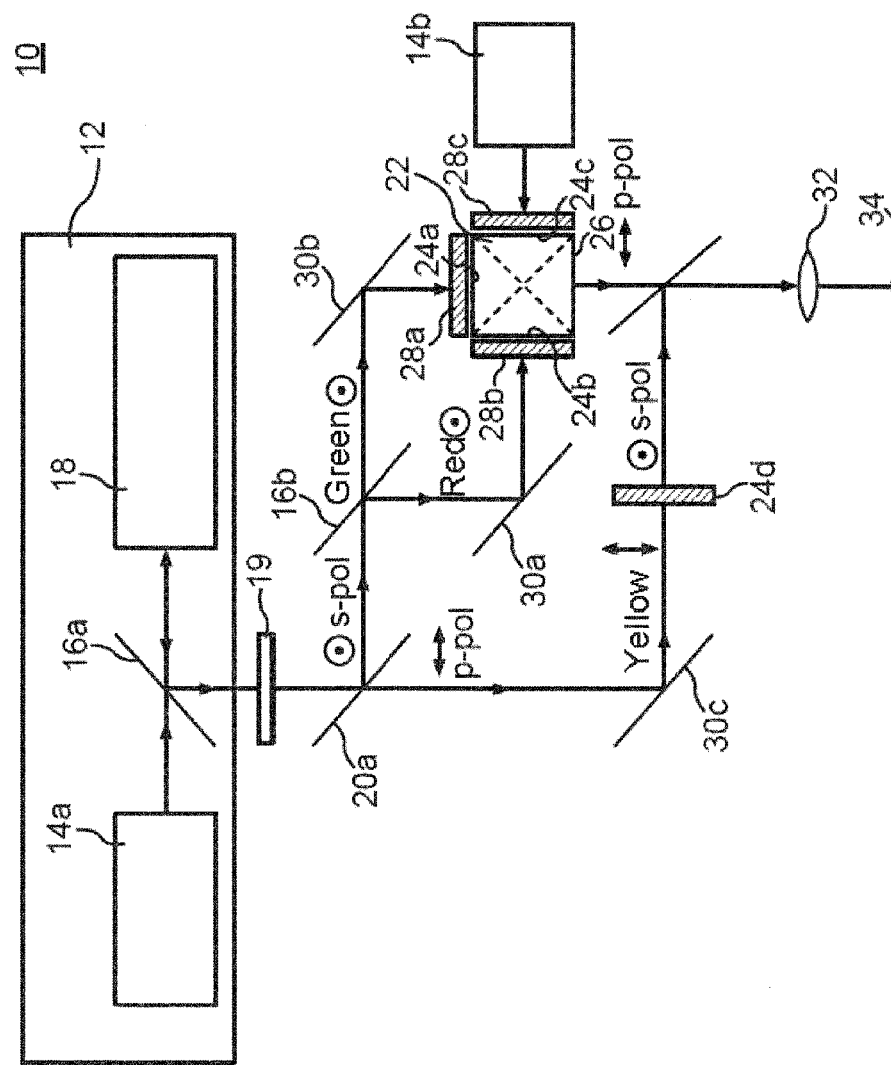
FIG. 2 shows a second embodiment of a light module according to various embodiments in schematic illustration.

In the embodiment illustrated in FIG. 2, the red radiation component is directed via a deflection mirror 30a onto the LCD panel 28b, while the green radiation component is directed via a deflection mirror 30b onto the LCD panel 28a. The yellow radiation component is directed via a deflection mirror 30c onto the LCD panel 24d. Accordingly, each of the three radiation components proceeding from the polarization beam splitter 20a as far as the respectively assigned LCD panel experiences exactly one deflection. This makes it possible to fashion the beam paths of the respective components with identical lengths, in various embodiments the distance between the respective LCD panel and the lens 32. In various embodiments, the following beam paths can be identical with regard to their distances: the distance of the beam path which begins at the dichroic beam splitter 16a enters into the beam cube 22 via the first input 24a, passes through the beam cube 22 and emerges at the output 26 thereof as far as the second polarization beam splitter 20b, then the distance of the beam path which begins at the dichroic beam splitter 16a, enters into the beam cube 22 via the second input 24b, passes through the beam cube 22 and emerges at the output 26 thereof as far as the second polarization beam splitter 20b, and finally the distance of the beam path which begins at the dichroic beam splitter 16a via the second deflection device 30c as far as the polarization beam splitter 20b. As a result, it is possible to realize a sharp imaging on the screen 34 even using a simple and thus cost-effective optical unit 32.

Figure 3:
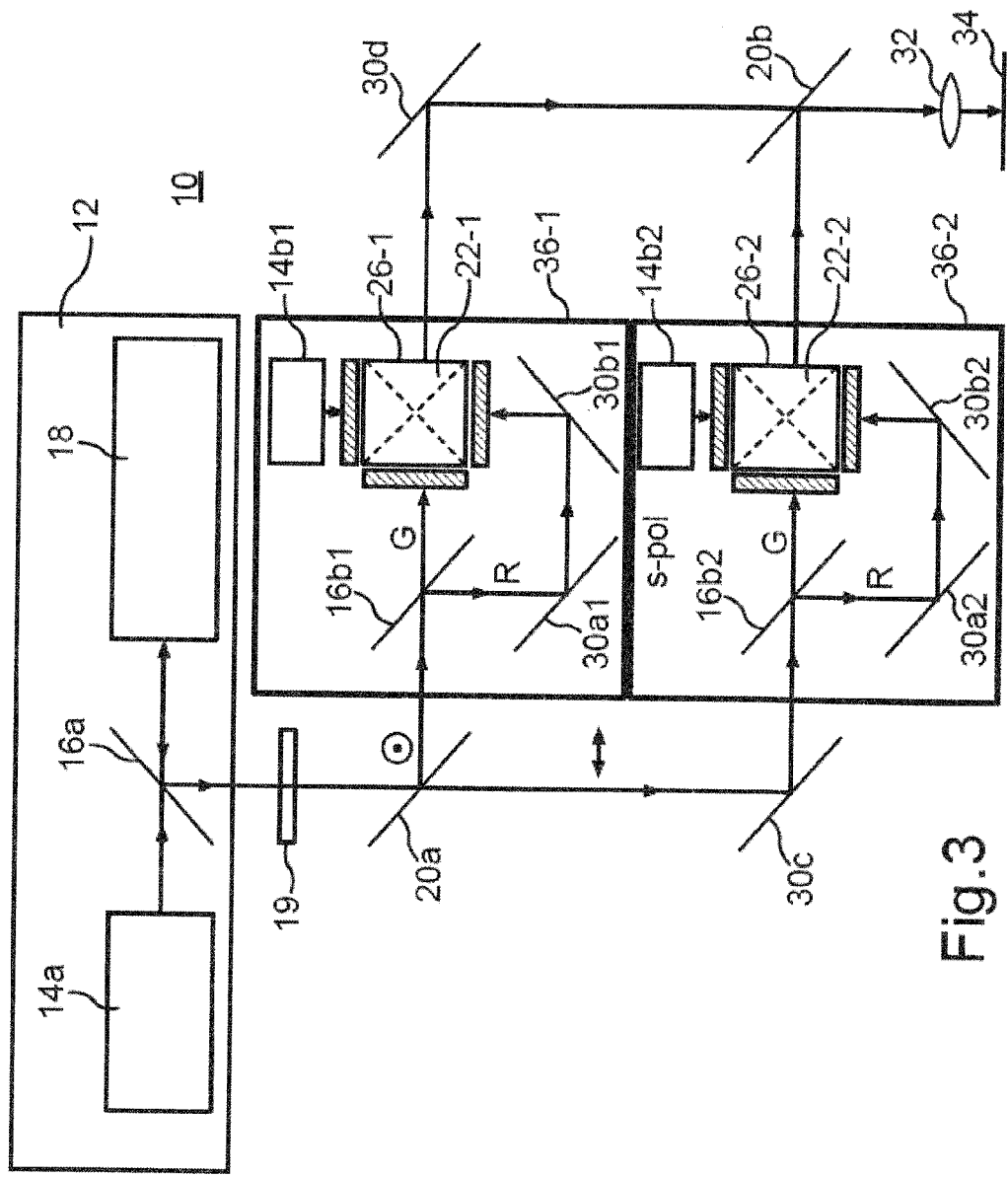
FIG. 3 shows a third embodiment of a light module according to various embodiments in schematic illustration.

In the embodiment illustrated in FIG. 3, a first optical unit 36-1 is formed from the dichroic beam splitter 16b1, the beam cube 22-1, the deflection mirrors 30a1, 30b1 and the second laser device 14b1. A second optical unit 36-2 of this type includes a dichroic beam splitter 16b2, a beam cube 22-2, deflection mirrors 30a2, 30b2 and a second laser device 14b2.

The signal provided at the output 26-1 of the beam cube 22-1 is directed via a deflection mirror 30d onto the polarization beam splitter 20b, while the output signal 26-2 of the beam cube 22-2 is directed directly to the polarization beam splitter 20b. The output signal includes two color spaces, wherein a first color space is spanned by the first optical unit 36-1 and a second color space is spanned by the second optical unit 36-2. Using polarization spectacles, the image projected on the screen 34 can be perceived as a 3D representation.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A light module for a projection device, the light module comprising:
   at least one light source designed to emit partly polarization radiation; and
   a first polarization beam splitter, which is arranged in the beam path of the radiation emitted by the at least one light source, wherein the polarization beam splitter is designed to provide radiation of a first polarization at a first output and radiation of a second polarization at a second output;
   wherein the at least one light source comprises:
      at least one first laser device designed to emit radiation in the blue wavelength range;
      a conversion device, which is arranged in the beam path of the radiation emitted by the at least one first laser device, wherein the conversion device comprises at least one phosphor and is designed to emit radiation in a predefinable wavelength range upon excitation by radiation from the at least one first laser device; and
      a first dichroic beam splitter, which is arranged in the beam path between the at least one first laser device and the conversion device, wherein the first dichroic beam splitter is designed to separate the radiation emitted by the at least one first laser device from the radiation emitted by the conversion device,
   wherein the light module furthermore comprises:
   a first beam cube having a first input, a second input and a third input and an output, wherein the beam cube is arranged in the beam path of the radiation provided at the first output of the first polarization beam splitter, wherein a first LCD panel is disposed upstream of the first input of the beam cube, a second LCD panel is disposed upstream of the second input of said beam cube and a third LCD panel is disposed upstream of the third input of said beam cube;
   a second dichroic beam splitter, which is arranged between the first output of the first polarization beam splitter and the first input of the beam cube, wherein the second dichroic beam splitter is designed to be transmissive for radiation in a first wavelength subrange of the predefinable wavelength range and reflective for radiation in a second wavelength subrange of the predefinable wavelength range;
   a first deflection device, which is designed to deflect radiation reflected by the second dichroic beam splitter into the second input of the beam cube;
   a second laser device, which is designed and arranged to emit linearly polarized radiation in the blue wavelength range to the third input of the beam cube; and
   at least one fourth LCD panel arranged in the beam path of the radiation penetrating through the first polarization beam splitter and a second polarization beam splitter, wherein the second polarization beam splitter is arranged to superimpose the radiation provided at the output of the beam cube and at least the radiation that has penetrated through the fourth LCD panel.

2. The light module of claim 1,
wherein the second laser device constitutes at least one of the at least one first laser device.

3. The light module of claim 1,
wherein a second deflection device is arranged in the beam path of the radiation penetrating through the first polarization beam splitter and is designed to deflect the radiation penetrating through the first polarization beam splitter onto the second polarization beam splitter.

4. The light module of claim 1,
wherein the first deflection device comprises the series circuit formed by a first deflection mirror and a second deflection mirror.

5. The light module of claim 1,
wherein the second deflection device comprises the series circuit formed by a first deflection mirror and a second deflection mirror.

6. The light module of claim 1,
the first deflection device comprises a first deflection mirror, wherein a third deflection device, which preferably comprises a deflection mirror, is arranged in the beam path of the radiation penetrating through the second dichroic beam splitter and the first input of the beam cube.

7. The light module of claim 6,
wherein the third deflection device comprises a deflection mirror.

8. The light module of claim 6,
wherein the first dichroic beam splitter, the second dichroic beam splitter, the first deflection device, the second deflection device, the third deflection device and the beam cube are arranged with respect to one another in such a way that the following distances are identical to +/−10%:
   the distance of the beam path which begins at the first dichroic beam splitter enters into the beam cube via the first input, passes through the beam cube and emerges at the output thereof as far as the second polarization beam splitter;
   the distance of the beam path which begins at the first dichroic beam splitter, enters into the beam cube via the second input, passes through the beam cube and emerges at the output thereof as far as the second polarization beam splitter;
   the distance of the beam path which begins at the first dichroic beam splitter via the second deflection device as far as the second polarization beam splitter.

9. The light module of claim 6,
wherein the first dichroic beam splitter, the second dichroic beam splitter, the first deflection device, the second deflection device, the third deflection device and the beam cube are arranged with respect to one another in such a way that the following distances are identical to +/−0%:
   the distance of the beam path which begins at the first dichroic beam splitter enters into the beam cube via the first input, passes through the beam cube and emerges at the output thereof as far as the second polarization beam splitter;
   the distance of the beam path which begins at the first dichroic beam splitter, enters into the beam cube via the second input, passes through the beam cube and emerges at the output thereof as far as the second polarization beam splitter;
   the distance of the beam path which begins at the first dichroic beam splitter via the second deflection device as far as the second polarization beam splitter.

10. The light module of claim 1,
wherein the second deflection device comprises a deflection mirror.

11. The light module of claim 1, wherein a first optical unit is formed from the second dichroic beam splitter, the beam cube, the first deflection device and the second laser device, wherein a second optical unit of this type is provided, wherein the LCD panel disposed upstream of the second input constitutes the fourth LCD panel, wherein the second optical unit is arranged in the beam path between the second deflection device and the second polarization beam splitter.

12. The light module of claim 1, wherein the conversion device comprises at least one phosphor having a dominant wavelength in the yellow wavelength range.

13. The light module of claim 1, wherein the conversion device comprises at least one phosphor having a dominant wavelength in at least one of the green or red wavelength range.

14. The light module of claim 1, the first wavelength subrange is in the green wavelength range and the second wavelength subrange is in the red wavelength range, or vice versa.

15. The light module of claim 1, wherein the first dichroic beam splitter is designed to be transmissive or reflective for radiation emitted by the at least one first laser device and reflective or transmissive for radiation emitted by the conversion device.

* * * * *